(12) United States Patent
Chang

(10) Patent No.: US 10,868,881 B1
(45) Date of Patent: Dec. 15, 2020

(54) LOADING WEB RESOURCES USING REMOTE RESOURCE PUSHING

(71) Applicant: Mingtai Chang, Harvard, MA (US)

(72) Inventor: Mingtai Chang, Harvard, MA (US)

( * ) Notice: Subject to any disclaimer, the term of this patent is extended or adjusted under 35 U.S.C. 154(b) by 284 days.

(21) Appl. No.: 15/396,086

(22) Filed: Dec. 30, 2016

Related U.S. Application Data

(60) Provisional application No. 62/273,181, filed on Dec. 30, 2015.

(51) Int. Cl.
G06F 15/173 (2006.01)
H04L 29/08 (2006.01)
H04L 12/911 (2013.01)

(52) U.S. Cl.
CPC .......... H04L 67/2814 (2013.01); H04L 47/70 (2013.01); H04L 67/26 (2013.01)

(58) Field of Classification Search
CPC ..... H04L 67/28; H04L 67/2814; H04L 67/70; H04L 67/26; H04L 67/2842; H04L 67/04
USPC ....... 709/202, 203, 213, 218, 219, 225–227, 709/230, 232, 245, 246; 726/2, 3, 11, 12
See application file for complete search history.

(56) References Cited

U.S. PATENT DOCUMENTS

| | | | |
|---|---|---|---|
| 6,510,469 B1 | 1/2003 | Starnes et al. | |
| 6,742,043 B1 * | 5/2004 | Moussa | G06F 17/30569 707/E17.006 |
| 7,003,572 B1 | 2/2006 | Lownsbrough et al. | |
| 7,185,063 B1 | 2/2007 | Kasriel et al. | |
| 7,254,634 B1 | 8/2007 | Davis et al. | |
| 7,656,908 B1 | 2/2010 | Begeja | |
| 8,402,367 B1 * | 3/2013 | Matsuoka | G06F 16/957 715/234 |
| 2002/0010761 A1 * | 1/2002 | Carneal | G06F 17/30902 709/219 |
| 2002/0073167 A1 | 6/2002 | Powell et al. | |
| 2002/0112082 A1 | 8/2002 | Ko et al. | |
| 2003/0004998 A1 | 1/2003 | Datta | |
| 2003/0028515 A1 * | 2/2003 | Nishikado | H04L 29/06 |
| 2004/0049579 A1 * | 3/2004 | Ims | H04L 67/2823 709/225 |
| 2004/0215716 A1 * | 10/2004 | Freudenthal | H04L 67/288 709/203 |
| 2005/0210122 A1 * | 9/2005 | Taylor | H04L 29/06 709/218 |
| 2008/0168171 A1 * | 7/2008 | Grabarnik | H04L 67/42 709/227 |
| 2009/0172801 A1 * | 7/2009 | Friedrich | H04L 29/12066 726/12 |
| 2010/0131673 A1 * | 5/2010 | Freudenthal | H04L 67/288 709/246 |

(Continued)

*Primary Examiner* — Dustin Nguyen
*Assistant Examiner* — Hao H Nguyen
(74) *Attorney, Agent, or Firm* — Fish & Richardson P.C.

(57) ABSTRACT

This specification describes systems, methods, devices, and other techniques for transmitting electronic resources to a client device. In some implementations, a computing system includes a client proxy system and a push server system. The client proxy system is configured to obtain requests issued from a client device and responses to requests issued by a surrogate browser of a push server system. The client proxy system matches responses from the push server system with requests from the client device to determine responses to the requests from the client device.

20 Claims, 11 Drawing Sheets

(56) References Cited

U.S. PATENT DOCUMENTS

| | | | |
|---|---|---|---|
| 2013/0054812 A1* | 2/2013 | Decoteau | G06F 8/36 709/226 |
| 2013/0191438 A1* | 7/2013 | Fujimoto | H04L 65/1083 709/202 |
| 2013/0226992 A1 | 8/2013 | Bapst et al. | |
| 2014/0095804 A1* | 4/2014 | Lientz | G06F 11/1464 711/144 |
| 2015/0012608 A1* | 1/2015 | Ishikawa | H04L 67/2842 709/213 |
| 2016/0072721 A1* | 3/2016 | Hill | H04L 41/0823 709/226 |
| 2016/0105374 A1* | 4/2016 | Thackray | H04L 67/2847 709/226 |

* cited by examiner

LOADING WEB RESOURCES USING REMOTE RESOURCE PUSHING

CROSS-REFERENCE TO RELATED APPLICATIONS

This application claims the benefit under 35 U.S.C. § 119(e) of provisional application U.S. Ser. No. 62/273,181, filed Dec. 30, 2015, the entire contents of which are hereby incorporated by reference in their entirety.

BACKGROUND

Web pages are often made accessible over a network (e.g., a Local Area Network or the Internet). A client device may request a web page by making a network request to an origin server that hosts the web page. A web browser on a client device is regularly used to retrieve web pages from one or more origin servers and to display the web page or a combination of web pages, e.g., on desktop computer monitors or mobile device displays. The browser can retrieve and coordinate a set of web resource elements that collectively provide a complete presentation of the web page, such as style sheets, scripts and images.

The popularity of the web and demands of dynamic features for web markup languages have made the structure of the web page increasingly complex. In some instances, seemingly simple web pages have been transformed into powerful interactive web applications using JAVASCRIPT, DHTML, DOM/CSSOM API, AJAX, and/or assorted HTML 5.0 features, for example. The availability of such programming features has changed how web pages are delivered to clients. Complete delivery of web pages today often involves delivery of not just the underlying HTML file, but also many dependent resources, which collectively form a complex dependency graph, with content markup defining the basic construct, stylesheets defining the layout, and scripts building up the resulting interactive application and responding to user input, potentially modifying both styles and markup recursively in the process.

Many round-trip communications between browsers and origin servers are sometimes required in order to obtain all the dependent resources for just a single web page. For example, a browser may send a HTTP (Hypertext Transfer Protocol) request to a website's server to request a web page and the server may send back a response to the browser, which, when coupled and processed with previously retrieved resources, will result in sending many more requests to the server to fetch additional pages.

SUMMARY

This document describes systems, methods, devices, and other techniques for delivering a web page to a client over a network. Some implementations of the disclosed subject matter may, in certain instances, achieve one or more advantages. For example, the number of round trips (e.g., requests and responses between a client and one or more servers) to obtain a web page may be reduced. In some instances, only a single round trip may be taken to download a given initial or primary web page, without the need to redesign the web page, to restructure the page layout or to modify the rendering logic at the client. In some implementations, the number of round trip communications can be reduced using a surrogate browser, which may be located closer to the origin servers for a web page than the client, and which may pre-fetch all or some of the dependent resources for a web page. The surrogate browser may push the pre-fetched resources back to the client all at once or in relatively few transmissions. Further, in some implementations, the client is configured to match returned or pushed resources with original client requests in order to satisfy them on the client side without the need to make round trips to origin servers.

Implementations of the subject matter described herein include a computer-implemented method. The method can be performed by a client proxy system. The client proxy system receives, from a client device, a primary request for an electronic resource that is stored on an origin server system. The client proxy system transmits, to a push server system, the primary request for the electronic resource. The client proxy system receives, from the push server system, (i) a first response to the primary request for the electronic resource and (ii) a second response to a first secondary request that the push server system independently generated. The client proxy system can cache the second response. The client proxy system provides the first response to the client device. The client proxy system receives a second secondary request from the client device. The client proxy system determines whether the second secondary request from the client device corresponds to the cached second response. In response to determining that the second secondary request corresponds to the cached second response, providing the cached second response from the client proxy system to the client device.

These and other implementations can optionally include one or more of the following features.

The electronic resource can be a web page, and at least one of the primary request or the second secondary request can be a Hypertext Transfer Protocol (HTTP) request.

The client proxy system can further perform operations that include obtaining, by the client proxy system, client environment data that identifies a configuration of an operating environment of the client device, and providing, to the push server system, the client environment data. The push server system can be configured to use the client environment data to at least partially replicate the configuration of the client operating environment of the client device when generating requests on behalf of the client device.

The push server system is configured to use the client environment data to virtualize at least one of a display resolution or a time zone of the push server system that matches a display resolution or a time zone of the client device.

The second response to the first secondary request can include an indication of a URL associated with the first secondary request. Determining whether the second secondary request from the client device corresponds to the cached second response can include comparing a URL associated with the second secondary request with the URL associated with the first secondary request.

The first secondary request can follow the primary request in a resource waterfall.

A network latency between the push server system and the origin server system may be less than a network latency between the client device and the origin server system.

Some implementations of the subject matter disclosed herein include a computing system. The system can include a client proxy system and a push server system. The client proxy system and the push server system can each be implemented as computer programs on one or more computers in one or more locations. The client proxy system can be configured to (i) receive primary and secondary requests for electronic resources from a client device, (ii) forward the primary requests for electronic resources over a network to a push server system, and (iii) receive responses from the push server system that result from processing the primary requests. The push server system can be configured to (i) receive primary requests for electronic resources forwarded from the client proxy system, (ii) obtain responses from one or more origin servers to successions of requests in respective sessions initiated by each of the primary requests, and (iii) return the responses to the successions of requests to the client proxy system. The client proxy system can be further configured to check for matches between secondary requests received from the client device and any responses to the successions of requests that the push server system returned to the client proxy system.

Some implementations of the subject matter disclosed herein include a computer-implemented method. The method can include receiving, at a client proxy system and from a server system, a response to a first request for an electronic resource, wherein the server system generated the first request without prompting from the client proxy system; receiving, at the client proxy system, a second request for the electronic resource from a client device; determining whether the response to the first request that the client proxy system received from the server system is a valid response to the second request that the client proxy system received from the client device; and in response to determining that the response to the first request that the client proxy system received from the server system is a valid response to the second request that the client proxy system received from the client device, returning the response to the first request to the client device as a response to the second request for the electronic resource.

Additional innovative aspects of the subject matter disclosed herein may be embodied in one or more non-transitory computer-readable media encoded with instructions that, when executed by one or more processors, cause the one or more processors to perform any of the methods disclosed herein.

DETAILED DESCRIPTION

A web browser is a software application for retrieving, presenting, and traversing information resources on the World Wide Web. One purpose of a browser is to bring information resources to users, allow the users to view the information, and allow the users to access other information. This process begins when the user inputs a Uniform Resource Locator (URL) or Uniform Resource Identifier (URI), such as "http://en.wikipedia.org", into the browser. The terms URL and URI are used interchangeably herein. The prefix of the URL, or scheme, determines how the URL will be interpreted. A commonly used scheme of URL starts with "http:" and identifies a resource to be retrieved using the Hypertext Transfer Protocol (HTTP). Information resources may contain additional lower level or secondary resources, which are also retrieved in order to complete the browser display or rendering of a web page. Within a rendered page there may be embedded hyperlinks linking to other information resources. Each hyperlink contains the URL of a resource to access. When the hyperlink is clicked, the browser navigates to the resource indicated by the link's destination URL, and the process of bringing multi-level content to the user begins again similarly to that of the typed-in URL.

The subject matter described herein generally concerns the resource retrieval aspects of web browsing. Described are techniques by which high latency problems with respect to web page requests may be reduced by having a web proxy system predict and pre-fetch content, in parallel, that is to be requested by a client. The client making the main web page requests includes a function set which is typically only a function subset of the traditional browsers such as INTERNET EXPLORER, FIREFOX, or CHROME. It is responsible for the rendering of HTML and CSS, interpreting/executing JAVASCRIPT, and managing the resource requests and responses to/from origin servers for the main web page without including the capability of the actual display of web pages and other extraneous browser user interfaces such as tabs, history, filters, etc. Due to their popularity, the web browsers described throughout this document are prime examples of web page request clients or simply clients. One standard protocol for a client to make web page requests to origin servers is HTTP. Without loss of generality HTTP is used as the prime example protocol through which the client makes its requests. However, the disclosed techniques can be applicable to any web client that provide retrieval of resources requested through HTML or similar markup language that require multiple round trips to the origin servers.

Figure 1:
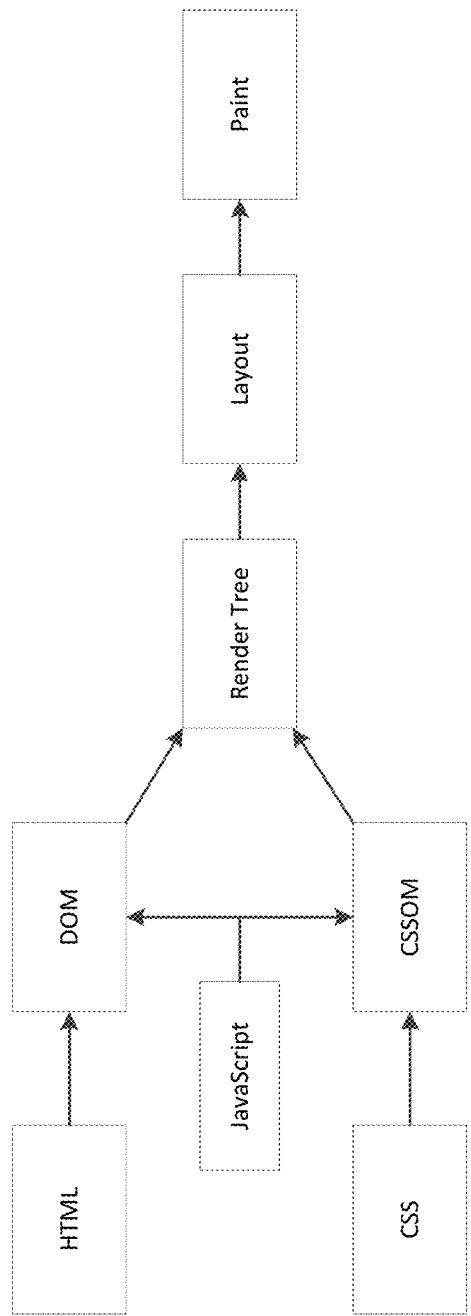
FIG. 1 depicts a resource loading process pipeline of the client.

FIG. 1 depicts a simplified browser processing pipeline 100. Since JAVASCRIPT execution can issue a synchronous "document.write" command, it can block DOM (Document Object Model) parsing and construction. Similarly, scripts can query for a computed style of any object, which means that JAVASCRIPT can also block on CSS. Consequently, the construction of DOM and CSSOM objects is frequently intertwined: DOM construction does not proceed until JAVASCRIPT is executed, and JAVASCRIPT execution does not proceed until CSSOM is available. To process a web page or to execute a web application, a web browser may require a wide variety of resources to produce the final output, the requests for which are issued at various stages of the parsing of the DOM/CSSOM and directed by a number of JAVASCRIPTs. The web browser incrementally discovers required resources and dispatches the necessary requests in parallel. The scheduling of when the resource is fetched is in large part determined by the structure of the markup.

As the web page download process becomes increasingly involved, some web browsers provide some instrumentation to see the "resource waterfall", which is a horizontal barchart-type data visualization that sequentially displays both the individual performance and cumulative effect of individual web page-elements loading in a browser. The load-time for the individual aspects of each web page element is displayed within the waterfall chart, including: Domain Name Server (DNS) resolution time, Connection, SSL, Request, First packet, Download, Start Time, End Time and Speed. Resource waterfall provides a visualization of data that is generated cumulatively and sequentially across the download process. It provides full visibility into each piece of content that is used to display the web page. Not only does it list all the resources, it shows them in time ordering with the duration of each load.

Figure 2A:
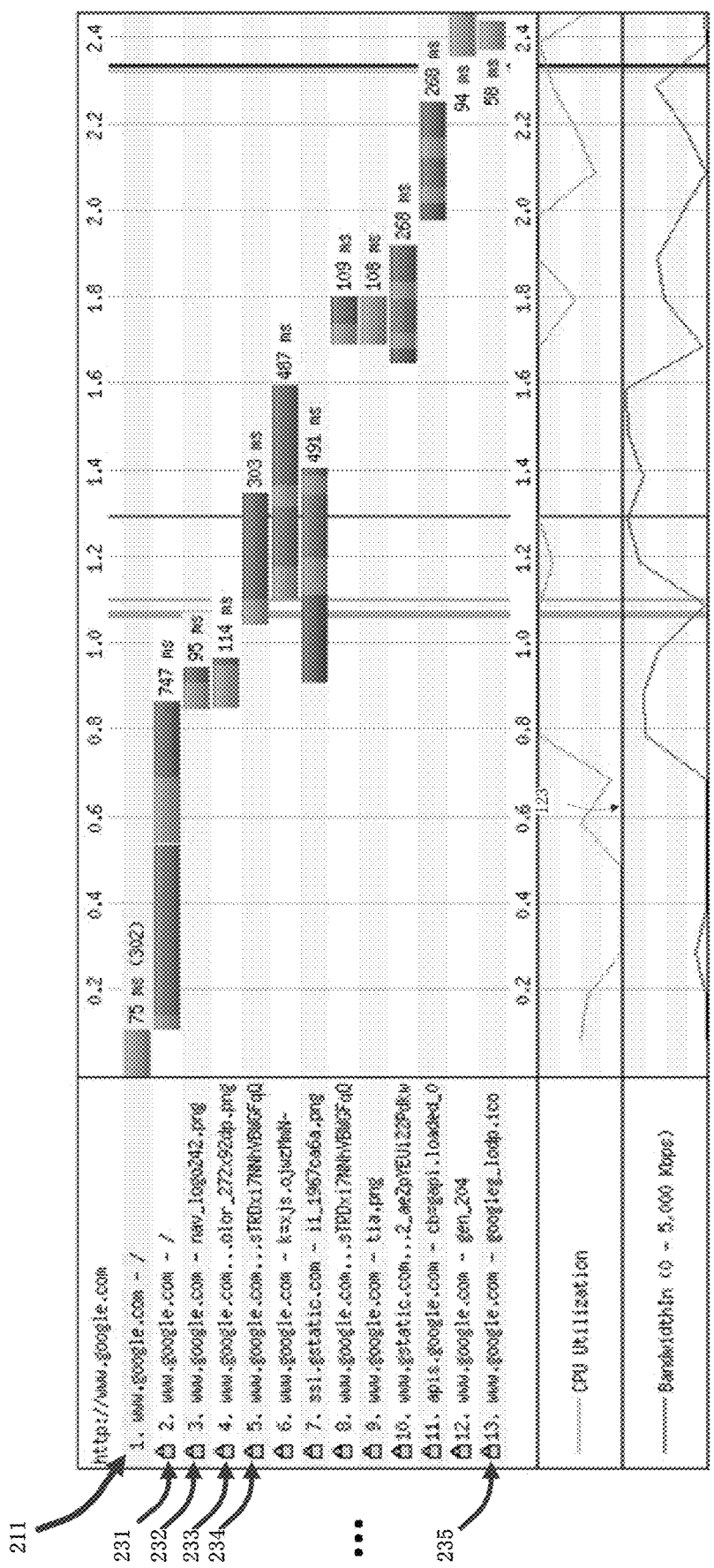
FIG. 2A is a "resource waterfall" for the home page of Google.com.

FIG. 2A is an example "resource waterfall" captured on Nov. 25, 2015 by the charting tools provided by www.webpagetest.org, an open-source project and a free web service that offers a web site for testing the performance of web pages from multiple locations around the world. This figure depicts the relatively simple web page for http://www.google.com, which consists of 13 resources of various types of image, css, and js (JAVASCRIPT), html, etc. Although there are 13 request/response round trips executed for loading all the resources (211, 231-235) in order to complete the initial or "primary" web page 211 for URL http://www.google.com, it is not feasible to make them all in parallel. (The primary web page is often referred to as the main web page). Some round trips may not commence until after the outcome of certain previous downloads is known. As a consequence, those round trips are clustered and scheduled in a successional manner, with each subsequent cluster of requests issued only after the completion of its preceding one. Even for this simple web page, there are four or more clusters of round trips observed, each of which consists of several parallel round trips. For more complicated web page such as www.oracle.com captured on Nov. 25, 2015 (251), depicted in FIG. 2B, there are 40 secondary resources of various types of images, css and JAVASCRIPTs, etc. with at least five successional round trips observed (271-274). For an even more complicated example of www.nytimes.com, captured on the same day Nov. 25, 2015, a visit to the site produced downloads of 308 resources of various types and triggered eight or more successional round trips. Although some considerable numbers of resources are fetched in parallel, the scheduling of certain resources clearly has dependency on others previously retrieved and processed. The browser may reprioritize some requests, but the incremental discovery of each resource in the document is what creates the distinct resource "waterfall effect", which produces a minimal number of successional round trips that can be difficult to be reduced due to how the web page is put together.

The execution of a web program primarily involves three tasks: fetching resources, laying out and rendering the pages, and executing JAVASCRIPTs. The rendering and scripting steps may follow a single-threaded, interleaved model of execution; it is not always possible to perform concurrent modifications of the resulting DOM. Accordingly, optimizing how the rendering and script execution work together during runtime can be important. However, in many situations the web program is simply blocked on the network, waiting for the resources to arrive.

Externally, as directed by the target URL intended by the user, the web browser conducts successional rounds of information retrievals, each of which is triggered either by the initial web page request or by follow-on requests issued based on other resources retrieved earlier. To completely process one such initial request or primary request (211, 251), a "waterfall" of secondary web requests 231-235 and 271-274 is issued by the browser proceeding along its processing pipeline, which prompts many more round trips to various origin servers. The maintenance of such a "waterfall" of resource retrievals incurred for a single initial or primary request (211, 251) is called a "session" herein. A session request is a primary request asking for the retrieval of all the resources required to complete the request.

In parallel with those sessions, a client may also issue certain asynchronous (async) HTTP requests initiated by some "dynamic" facilities such as AJAX or HTML 5.0 websocket protocols. For those asynchronous "dynamic" requests, similar waterfalls of secondary requests may also be issued. In some implementations, the techniques disclosed herein can reduce the number of round trips in completing those waterfalls of retrievals, triggered either synchronously or asynchronously, in order to improve the browser performance.

Figures 3A, 3B:
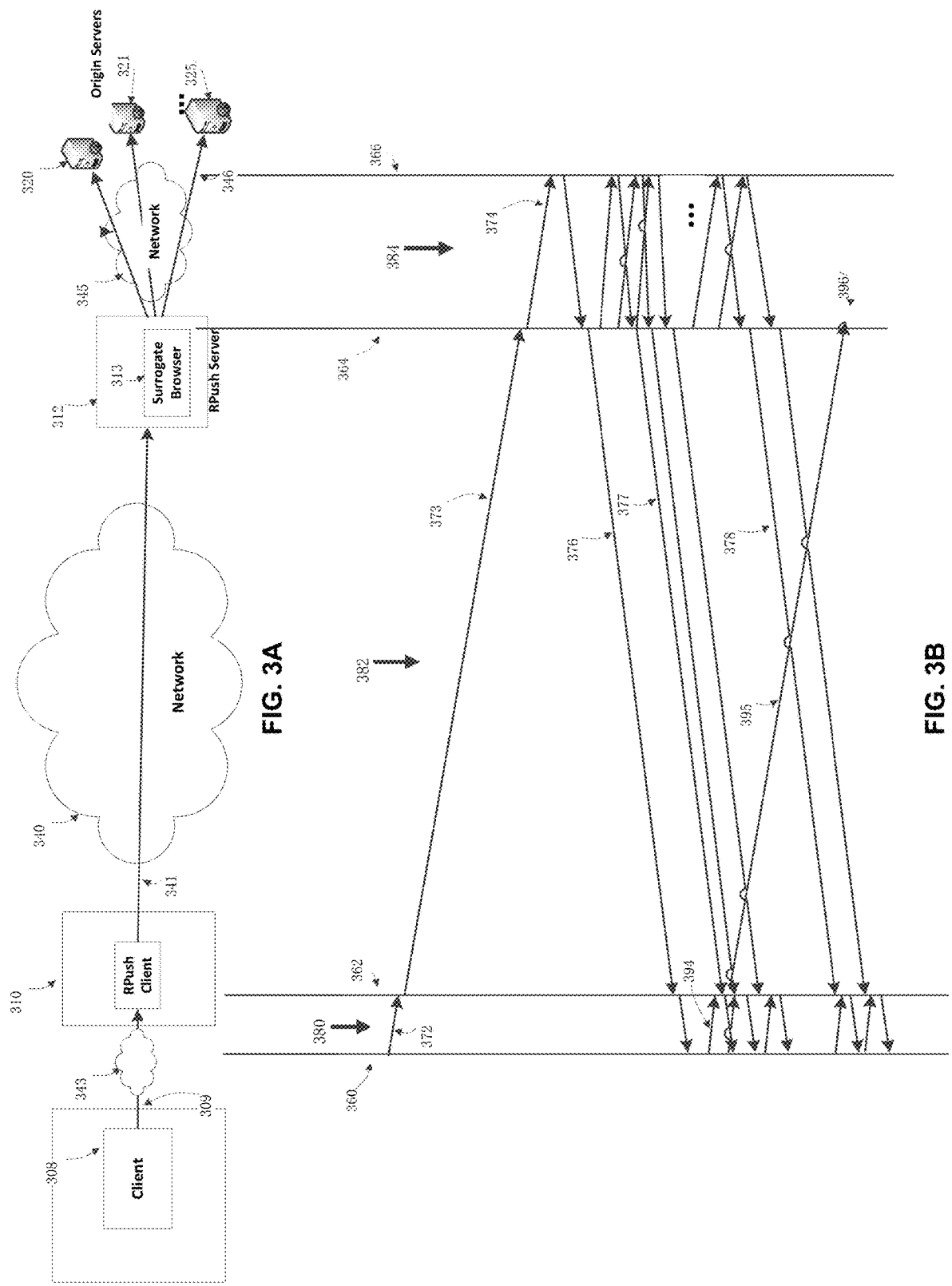
FIG. 3A is a block diagram illustrating a proxy based resource pushing system for the reduction of round trips of loading web pages.
FIG. 3B is an example message transition diagram.

In some implementations, a proxy system is provided, an embodiment of which is depicted in a high level schematic diagram in FIG. 3A. The main method of this proxy system comprises two parts with the client proxy part (the RPush client 310) situated in close proximity to the client 308 through network 343 and the paired server proxy part (the RPush server 312) across network 340 at a remote site, close or with low latency to the origin servers (320-325) across network 345. 346 is an example of the transport path going through the network 345. Network 345 may be a subset of 340, but 346 is assumed to offer lower latency than path 341. On the other hand, network 343 is typically an intranet LAN. Furthermore, RPush client may be hosted on the same server where the client resides without involving any network, in which case the message path 309 may be a simple socket interface, an interprocess message passing or even function calls. In the disclosed embodiment, the message path 309 is based on the standard HTTP client to proxy interface. The embodiments may employ multiple RPush servers if the origin servers are sufficiently dispersed geographically to warrant additional deployments of server proxies such that each RPush server is positioned for low latency access to its assigned origin servers. In this case, the RPush client needs to be configured in order to determine the destination RPush server for each primary request.

In some implementations, a "surrogate" browser 313 is provided in the RPush server, which creates its own sessions and issues requests to origin servers on behalf of the actual browser in order to satisfy the primary request. RPush server then automatically delivers all independently-retrieved responses back to the browser through a reliable transport 341. The process of delivering those responses to RPush client without direct prompting from RPush client except the primary request is described as a "push" process herein. On the original browser side RPush client collects all resources in the pushed or returned responses and attempts to use them to satisfy all the primary and secondary requests made by the browser locally without making direct remote requests to origin servers. In other words, secondary resources are "prefetched" by the RPush server and "pushed" to the RPush client with the aim of substantially reducing the number of round trips.

The surrogate browser 313 is a full-function browser as far as the capability of parsing web pages and retrieving page resources is concerned, which at a minimum includes the renderer of HTML and CSS and an interpreter of JAVASCRIPT without the need for actual display of web pages and other extraneous browser user interface. A typical "headless browser", implemented by stripping off from a browser those display functions and extraneous user interfaces, is also sufficient for being the surrogate browser. The surrogate browser supports the same browser processing pipeline as depicted in FIG. 1 and functionally is preferred to be a mirror image of the actual client 308 used by the web user. This "virtualized" browser or headless browser is described as the surrogate browser herein in order not to be confused with the actual user browser that is usually termed the actual, original, initiating, client browser or client web browser herein. "Virtualization" is defined as the effort to replicate the actual browser functions and parameters on the remote surrogate browser.

FIG. 3B is a message transition diagram illustrating a typical scenario where the initiating client 308 makes a primary request, which is intercepted by RPush client 310 and delivered to the surrogate browser 313 in RPush server 312 that launches an independent session on behalf of the original primary request.

The vertical lines represent the network end point of browser 360, RPush client 362, RPush server 364 and origin servers 366 respectively. Message traffic grouped under column 380, 382, and 384 are for representational purposes only without furnishing every detail for the depicted hypothetical protocol exchanges. The primary request 372 is sent to RPush client first, which is sent through the network 340 as 373 and eventually arrives at one of the origin servers as 374. On receiving the primary request 373 by the RPush-server/Surrogate-browser 312/313, the RPush-server/Surrogate-browser 312/313 process the primary and all follow-on requests, prefetching all the resources necessary to complete the primary web page in the manner of the resource waterfall, and pushes all received resources like 376-378 to RPush client during the process. The present techniques can be advantageous when the browser must travel a long distance through the network 340 to reach the origin servers. One such example would be that the client 308 is located in China while the origin servers 320-325 are in the U.S., with network 340 as the transpacific internet and network 345 domestic in the U.S. Another example would be that a U.S. SALESFORCE.COM user wants to access the SALESFORCE.COM servers located in the U.S. while travelling abroad outside of U.S. As another example, whereas the "first mile" is frequently the speed bottleneck in communication networks worldwide—especially in the wireless situation, the present techniques can be highly effective in enhancing even the domestic network access.

Typical round trip latency for an intercontinental session may be as follows: all exchanges between browser and RPush client in 380 are sub-millisecond; between RPush client and RPush server in 382 are around 200 ms (millisecond, between Shanghai, China and the U.S., for example); and between RPush server and origin servers in 384 may be made less than 10 ms or shorter, depending on the location of the RPush server. In some implementations, the benefits of these techniques are pronounced when the RTT between the browser and origin servers is one or more magnitudes larger than that between the RPush server and the origin servers. In some cases, it is attainable to place the RPush server in a data center (e.g., cloud) or hosting site in close proximity to the origin servers. For some enterprise VPN applications, the RPush server may be placed with the origin servers inside the campus or data center of the enterprise, wherein the network 345 may be separate from network 340.

The number of end-to-end round trips through 341/382 typically observed in waterfall charts can be substantially reduced, by RPush server "prefetching" all or some (e.g., a majority) of the required resources per initial or primary request 373, and pushing those prefetched resources back to the RPush client. RPush client provides a staging area for matching those resources pushed back by RPush server with the original primary and secondary requests issued by the browser 308.

Primary requests such as 211 or 251 are sent to RPush server as the exemplary leading or primary request 373 for the session by RPush client to enable the surrogate browser 313 to produce its own waterfall of request/response flow to origin servers, based only on the primary request 373 passed in. The waterfall created by the surrogate browser after receiving primary request 373 is independently generated from that by the client 308 for 372. The exchanges of messages in 309/380 and 346/384 are standard request/response waterfall-like HTTP traffic streams.

Other than the primary request, there may be additional secondary requests such as 394/395 that will be passed on to RPush server. Those are secondary requests not originally and/or immediately satisfied by the RPush client. Those forwarded secondary requests are to guarantee that all exceptions due to imperfection in the matching rules table 410 (explained more in later sections) are remedied.

In FIG. 3A the browser may be an exemplary client that triggers those waterfalls. The RPush client 310 can be an integral part of the client 308 or independently located away from the browser embodied as a proxy system as long as the interface 309 between the browser and RPush client is unimpeded (e.g., the support of session-related parameters through RPush proxy system specific entity headers or other interface conventions) and the original transportation latency to origin servers (from 308 to 320-325) is not adversely affected. On the other hand, the RPush server 312 has much lower network latency than the browser in making requests to the origin servers (through network 345). In the typical application scenarios, the RPush client would be collocated with the browser on the same PC and the RPush server placed at a location with low network latency to the origin servers.

Those of skill in the art will recognize the additional SSL handling for getting to the actual HTTP data if the browser request is of HTTPS scheme and the RPush client in an embodiment is implemented as a proxy system. For SSL processing, in some implementations, a proxy system relies on the trust of the user/browser, which will accept the root certificate issued privately by RPush proxy system and imported during the software installation of an embodiment if the actual SSL certificates of the origin servers are not available. In this case the RPush client can accept requests from the browser, decrypt them and later on encrypt the responses based on the privately issued SSL certificate. The standard SSL protocol in accessing the actual origin servers general only occurs between RPush server and origin servers protected by the real SSL certificates of the origin servers. Another variation would be for the browser sending the request to RPush client in unencrypted HTTP and configuring the RPush proxy so the requests issued by RPush server to origin servers adopt the SSL scheme.

Figure 2B:
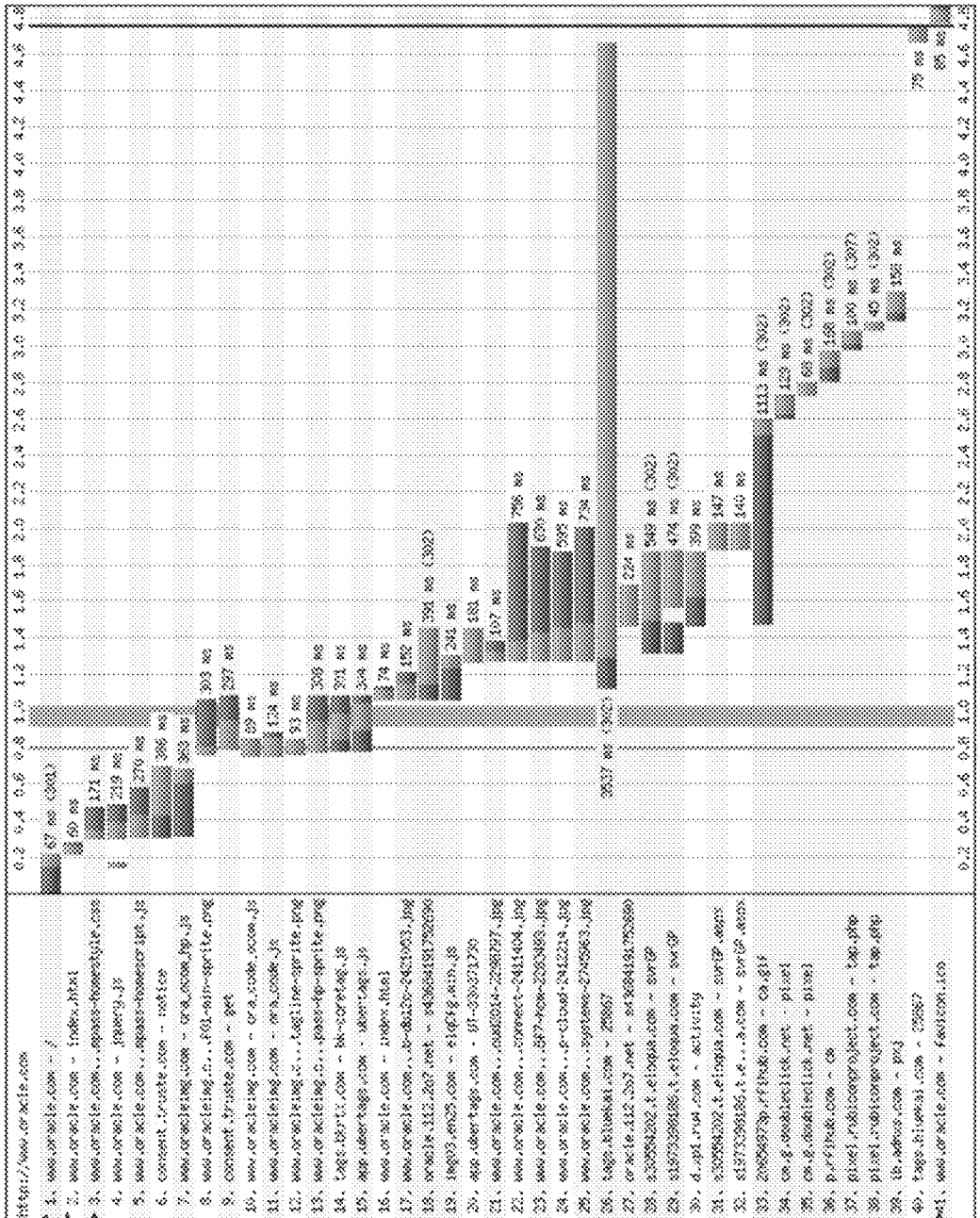
FIG. 2B is a "resource waterfall" for the home page of Oracle.com.

To support the RPush proxy system, browser requests are classified into the following types:

Primary: This is the initial or leading request, which is generally originated from a user input such as the entering of a URL or clicking on a hyperlink. The leading requests 211 in FIG. 2A and 251 in FIG. 2B are typical example of primary request.

Secondary: This is the follow-on request for resources required to complete the primary request. In FIG. 2A and FIG. 2B, those requests other than 211 in FIG. 2A and 251 in FIG. 2B are secondary requests.

Async: This is the request not necessarily related to user inputs and not usually triggering a cascade of follow-on secondary requests (a degenerated waterfall). Examples are: web page analytics data collection, independent one-off advertisement request, AJAX request, etc. Async requests may be forwarded to their origin servers without optimization via the RPush proxy system. In some implementations, async requests are optimized using the RPush proxy system.

An exemplary method for RPush client to obtain information about the classification of a browser request is simply for the browser to explicitly indicate it in the following RPush proxy system header:

RPush proxy system specific entity header: RPush-Service
RPush-Service field-value: level [";" session-id]
level="primary" "secondary" "terminate" "async"
session-id=1*DIGIT For session type requests, there may be multiple sessions running in parallel. For example, parallel sessions may be generated by multiple independent tabs supported by the browser. Sessions can be identified using a session ID, which may also be a part of the aforementioned entity header "RPush-Service". A session may be terminated either formally through the "terminate" header field-value or by the re-use of the same session-id by the "primary" header. If there are multiple parallel sessions coming from different clients, a GUID (globally unique identifier) technique may be utilized to avoid duplicate session IDs.

Alternatively, if the browser were to be handled as a black or grey box, the classification information may not be directly obtainable. An embodiment may simply derive it by estimating based on the resource type indicated through the file extension in the request URL, such as html, dhtml, asp, aspx, php, jsp, etc. In this black or grey box embodiment the RPush client differentiates different session traffic based on the file extension and assigns session ID autonomously. This heuristic approach may not be optimal but can be helpful in reducing some of the round trips. Alternatively, an embodiment may publish an RPush proxy system standard so that a web application can be made RPush proxy system aware or conformant by following the standardized rules in order to take advantage of the RPush proxy system performance improvement. Those rules would define how the primary and/or secondary can be distinguished and when a session will be terminated. As an example, such a standard may supply syntax rules specifying how token can be embedded in the resource path for indicating the type of requests. Furthermore, if it is functionally feasible to modify the response to the primary request and to embed into the JAVASCRIPT a user input capturing event logic (e.g., the capturing of onunload or onload events), the subsequent primary requests may be captured and communicated to RPush client from the JAVASCRIPT in the browser. Additionally, if the browser tab ID is obtainable through browser extension or plug-ins (such as Google Chrome Extensions), parallel sessions may be supported.

In some implementations, one objective of the disclosed techniques is to reduce the number of successive round trips during the service of the primary web page request where the trigger for each cluster of round trips relies on the structure of the markup and the outcome of previous round trips. Instead of the usual multiple rounds of visits to the origin servers in a waterfall fashion, the embodiments can localize the "waterfall" effects to the browser interface 309/380 and to the visits 346/384 from the surrogate browser 313 to origin servers 320-325. The time consuming part of the travel 341/382 between the RPush client and the RPush server typically costs only a single round trip with all the resources pushed back automatically by the RPush server to the RPush client delivering all the potential responses "prefetched" by surrogate browser 313.

In addition to the optimization based on reduction of round trips for completing the request/response waterfalls, other improvements based on prefetching may be supported. For example, RPush server may aggregate multiple URL redirections into one and return the redirected responses to the RPush client in the push stream.

HTTP protocol is based on a request/response paradigm with the request sent and response received by the browser in the same connection to the origin server over a reliable transport. There is no matching issue between the request and response, as both are encompassed by the same connection in a predetermined pipe-lined order. On the other hand, the message passing between RPush client and RPush server is RPush proxy system specific and the original HTTP request/response convention may no longer be preserved in the RPush proxy system traffic stream 382. Accordingly, independently issued or prefetched requests/resources at the RPush server may need to be matched up with those on the RPush client side in order to satisfy the original primary browser request and to avoid making costly and numerous round trips.

When the primary web page request 372/373 arrives at the surrogate browser 313, it will be serviced by the surrogate browser in a functionally equivalent way in its attempt to retrieve all the resources required to service the primary web page. However, the original browser carries out its function in its local environment on the client side, which may not be directly accessible or too remote to retrieve cost-effectively by the surrogate browser. In order to produce a functionally equivalent waterfall of retrieved resources, the client browser environment can be replicated or approximated at the surrogate browser.

As examples, the following environment variables may affect the execution of a web browser in retrieving the requested resources to satisfy a web request, outlined and classified below:

V1. Local client operational environment
Display resolution
Time zone
DNS returns
V2. Client browsing history
Cookies
HTML 5.0 Local Storage
V3. Client-browser-specific logic and parameters
Randomly generated numbers
Timestamp
V4. Client cache
Browser cache
V5. Client-browser-only add-ons or extensions INTERNET EXPLORER add-ons, CHROME extension, etc.

As all the non-primary request URIs issued to the origin servers are part of the self-contained process of producing the "waterfall" of request/response flow by the surrogate browser, those independently generated requests are frequently different from the actual browser requests due to variance in the operational environments between the original browser and its surrogate browser. However, many web applications do preserve the resource URLs or at least a substantial part of them. For example, many dynamic web applications are database-centric. Some environmental variables are generally used only to keep track of an individual user's environment so that origin servers may interact with each individual user in a customized manner through browser, with the database resource specifications basically the same.

In order to generate identical or equivalent waterfalls of retrieved resources, the original client and its surrogate may maintain substantially identical operating environments in terms of those environment variables. Maintaining identical or equivalent values for some of the variables can be accomplished using one or more of the following techniques. In some implementations, the RPush server (e.g., the surrogate browser) identifies a configuration of the client (e.g., the web browser at the client) operating environment and re-configures itself to match the identified configuration of the client in relevant respects so as to replicate the client browser's operating environment at the surrogate browser. The client proxy server may, for instance, obtain information that indicates the configuration of the client operating environment and may forward this information to the RPush server to allow the RPush server to re-configure itself (e.g., re-configure the surrogate browser) to match the client operating environment. For example, display resolution and time zone can be "virtualized" and emulated at the surrogate browser, DNS servers made to guarantee their resolution to the same IP addresses, and/or V2 category cookies carried with each request and applied to the surrogate browser before its processing.

In some implementations, rather than assuming that all the environment variables are made the same and all request URLs and their independently generated counterparts exactly alike, the environment variables may be approximated. Instead of exact URL match, a set of matching rules is expected to be offered by applications for matching responses with their corresponding browser requests based only on partial matching of the URL in the corresponding resource tree or specific transformational rules. With the offered matching rules to bridge the differences, not all the environment variables need to be maintained identically.

In other words, rather than insisting on the literal equivalence of URLs for matching pushed entities with the original browser requests, an embodiment of the disclosed techniques provides that the resource trees or resource waterfalls can be independently produced by their respective browsers. On the RPush server side the resource tree for a session is independently generated by the surrogate browser. Its collected responses are pushed back to the RPush client to be matched up with their counterparts according to a resource "matching rules table" defined according to the specifics of the application scenario. The strong equivalence rule is relaxed to allow for matching up similar or functionally equivalent URLs, not necessarily identical, according to the matching rules table.

In some implementations, the web applications (e.g., a web page) can indicate the complexity of environmental variables and may define their own entity matching rules accordingly. The more involved they are with those environment variables, the more complicated those matching rules will be. For example, a web application may opt to emulate all variables in the V1 category on both sides, carry relevant cookies on all requests and force them on the surrogate browser before execution, avoid completely using HTML 5.0 Local Storage, avoid the involvement of any client browser add-ons or extensions, and not rely on randomly generated numbers and timestamps. In this scenario, the matching rules table can be made in a very straightforward manner. For example, retaining only those query fields and ignoring both the fragment and query values may be sufficient. Furthermore, if the scope and coverage of the environment variable can be sufficiently confined and made not to affect the resource URLs, an embodiment may adopt the HTTP/2.0 to push responses received at the RPush server directly to the client browser.

An embodiment will further offer the option to emulate those V1 variables and enforce the equivalence of V2 category cookies as part of the RPush proxy system platform support. It may further offer interfaces, APIs, configuration options or call-backs so that the HTML 5.0 Local Storage and other variables can be maintained consistently. Alternate embodiments may be devised to replicate or approximate those environment variables mentioned herein and/or future context of environment variables without departing from the contemplated subject matter.

Those of skill in the art will make sure sufficient amount of the browser environment variables are captured and replicated on the surrogate browser side so that the requested server resources can be correctly identified as originally targeted for by the client browser in order to deploy the disclosed techniques in customized application scenarios.

As in the example depicted in the message transition diagram in FIG. 3B, the majority of the pushed resources arrive at the RPush client prior to the actual requests made by the browser. Browser requests therefore are generally satisfied by the pushed entries. For those browser requests not immediately satisfied such as 394, as an option, the RPush client forwards them to the RPush server (395) as an insurance against the possibility of the surrogate browser not being able to retrieve the necessary resources due to certain discrepancies in the execution environment between the original browser and its surrogate browser or due to problems in the matching rules table. Those unsatisfied browser requests will travel to the RPush server in order to make sure they are carried out. If it is not already issued to the origin servers on its arrival at the RPush server, it may not be part of the resource waterfall of the primary request executed at the surrogate browser and will be sent to origin servers directly. In those infrequent cases when a browser request received at the RPush client earlier than the arrival of its matching pushed entry, the matching response in many cases would arrive at the RPush client with a lag in the pushed flow without the RPush server's needing to issue an independent request to origin servers for it. In other word, 395 will be discarded at 396 after discovering its presence in the resource tree at the surrogate browser. Traffic flow in 341/382 is RPush proxy system specific and with the exception of the leading primary request 373 most other messages are "push" traffic in the direction from the RPush server to the RPush client.

The messages between browser and the RPush client in 380 and between the RPush server and origin server in 384 follow standard HTTP, which produces the typical waterfalls of requests and responses of multiple round trips. The present techniques aggregate those waterfalls into a single round trip 382 in most cases between the RPush client and the RPush server following the RPush proxy system specific protocol.

As the push traffic flow 382 is not under the constraint of the standard HTTP message flow, there are additional optimization options available. As examples, this push traffic may be uniformly compressed as a deployment option, utilizing standard data compression, RE (Redundancy Elimination) or other compression technology. Resources pushed back may be prioritized so the RPush client can make higher priority ones available to browser sooner in order to optimize browser's processing pipeline. The bandwidth and flow control may be dynamically adjusted based on the network conditions and QoS requirements. Without the constraints of HTTP protocol, an embodiment can use any reliable transport, UDP, parallel TCP, any forms of pipelining, etc., and functionally multiplex all request/response streams through the same transport.

Since the responses from the origin servers are not requested directly by the client browser, techniques for matching the origin server responses captured by RPush server with the client browser requests, either primary or secondary, can be offered through the RPush proxy system URL matching rules table. There are several parts of supporting this matching mechanism in the embodiments:

1. Attach to each HTTP response message coming back from origin servers the URL of the original RPush server request before delivering or pushing to the RPush client.
2. The RPush client is given a URL matching rules table 410, which defines how the browser requests, of either primary or secondary type, will be satisfied by the responses pushed in by the RPush server.
3. For each session the RPush client maintains a pending list (session pending list) of unsatisfied browser requests and unmatched pushed-in resources as a buffer for delayed matching as the browser requests and the RPush server responses arrive contemporaneously.

In some implementations, item 1 above may be performed by the RPush server inserting into each HTTP response message from the origin server an RPush proxy system specific non-standard entity header "RPush-Marker", which records the URL in the original request message that the RPush server made to the origin servers and other RPush proxy system specific data intended for RPush client. This entity header is inserted into the response message header after receiving it from the origin server before delivering to the RPush client. It also retains the original session ID in the original RPush-Service. The exemplary approach preserves the HTTP message format for ease of downstream handling.

In some implementations, each response message may be framed in such a way that the return message from the origin server, the original RPush server URL (RPush-Marker), and the session ID are all bundled into a single message, not necessarily conforming to HTTP format, before pushing back to the RPush client.

Some implementations utilize a matching rules table to conduct the matching of the pushed resources with the browser requests. In some implementations, web applications can be designed to comply with a set of published standards or guidelines that may optimize the ability of the remote resource-pushing system to process requests and responses associated with the web application. For example, the requests and responses may comply with the guidelines to ensure they can be readily parsed and matched by the RPush proxy system. With functionally equivalent browsers on both sides, matching rules may be simple "equivalence" rules by matching up identical URLs, which is easily achievable if the web application refrains from using HTML 5.0 local storage, any randomly generated numbers or timestamps. In that case, the RPush-Marker on the pushed resources will be identical to the original request URL if successfully matched.

Figure 10:
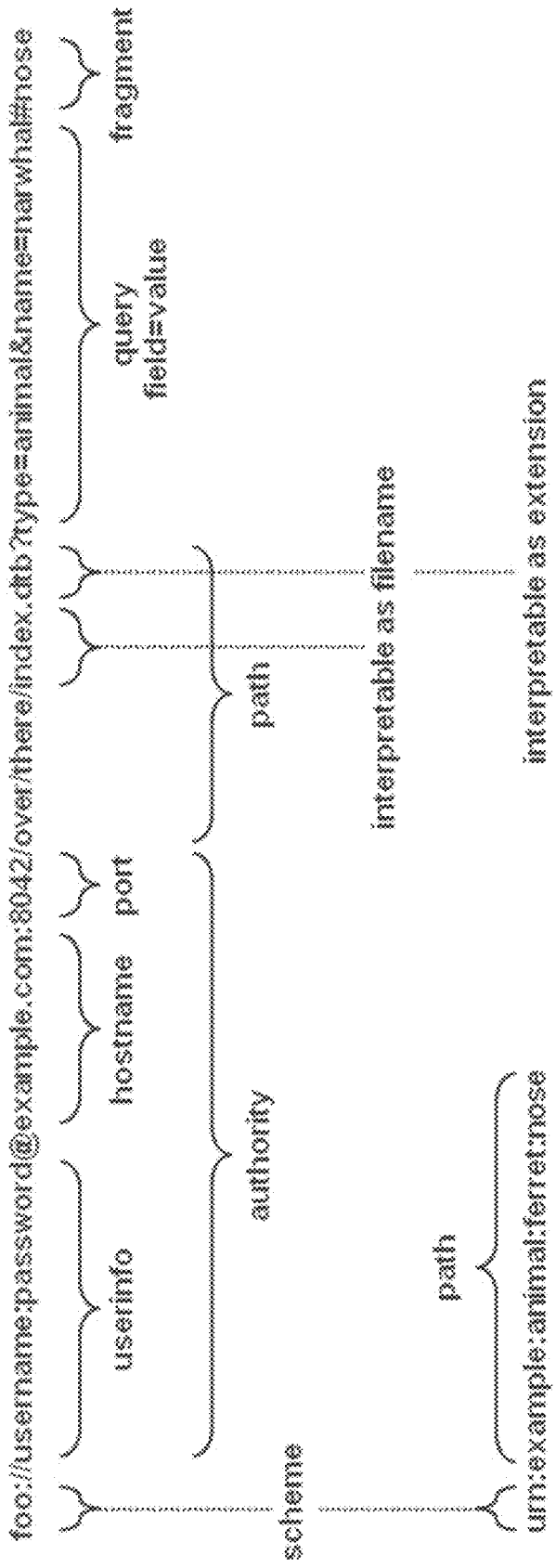
FIG. 10 is a description of a HTTP URL or URI as defined in HTTP/1.1 RFC.

For the web applications that utilize environment variables not identically maintained on both browsers due to divergence in the use of their respective local environment variables, those of skill in the art may implement an embodiment of the present techniques by adopting a default set of matching rules, with exceptions to the default rules further defined to complete the implementation. One such a set of default rules for URL described in FIG. 10 is as follows:

All methods on the HTTP Request-Line other than GET are handled as async browser requests.
The scheme, authority and path are identical.
Fragment is ignored.
All query values are stripped off from query string with only the query named and "=" remaining.
For those query fields to participate in the URL matching, they can appear in both the RPush-Marker and the browser URL and are compared to be equivalent case-insensitively.

With these default rules, a web application may provide the following exceptions to the aforementioned default rules as part of the configuration specification during the deployment (outline):

Any query field name in the query string may not appear more than once.
All or subset of query fields are to participate in the URL matching.
One or many of the following:
Field name such-and-such is stripped off and not participating in the rule matching comparison.
Field value for such-and-such may be present and compared equal.
For those query fields to participate in the URL matching, they may appear in both the RPush-Marker and the browser URL, with equivalent field values.

The RPush-Marker and the original URLs are compared for a match based on the default rules and the specified exceptions. Specific embodiments may not operate on an explicitly provided matching rules table but on a set of default rules implicitly defined.

In order to deploy the disclosed techniques, application engineers may limit the scope of their environment space to fit the request/response pattern into the matching rules deemed appropriate to the application. In an embodiment of the disclosed techniques, the RPush proxy system method accepts matching rules for its deployment, in the form of API, call-backs, configuration specification of matching syntax or other matching specification defined by those skilled in the art.

In some implementations, the system may provide self-detection or feedback mechanisms for non-conforming HTML pages or resources that fail to match with any pushed responses or for ambiguity while applying the matching rules.

For those scenarios where the target web servers are not part of the administration domain or the web applications are not designed to work with RPush proxy system, such as the SaaS environment like salesforce.com or Microsoft Office 365, the matching rules table can be worked out by exhaustively exercising the web access tree (sitemap) and identifying the rules manually and retroactively to see if they can be made RPush proxy system conformant.

For ease of administration and deployment, an embodiment can send or push the matching rules tables to the RPush clients as one of the system initialization steps.

There may be other messages issued by the browser and sent to some origin servers local to the browser/RPush-client without applying the RPush proxy system logic, such as local CDN data or local advertisement feeds. Those messages are generally async in nature and the system may simply opt not to optimize them.

Figure 4:
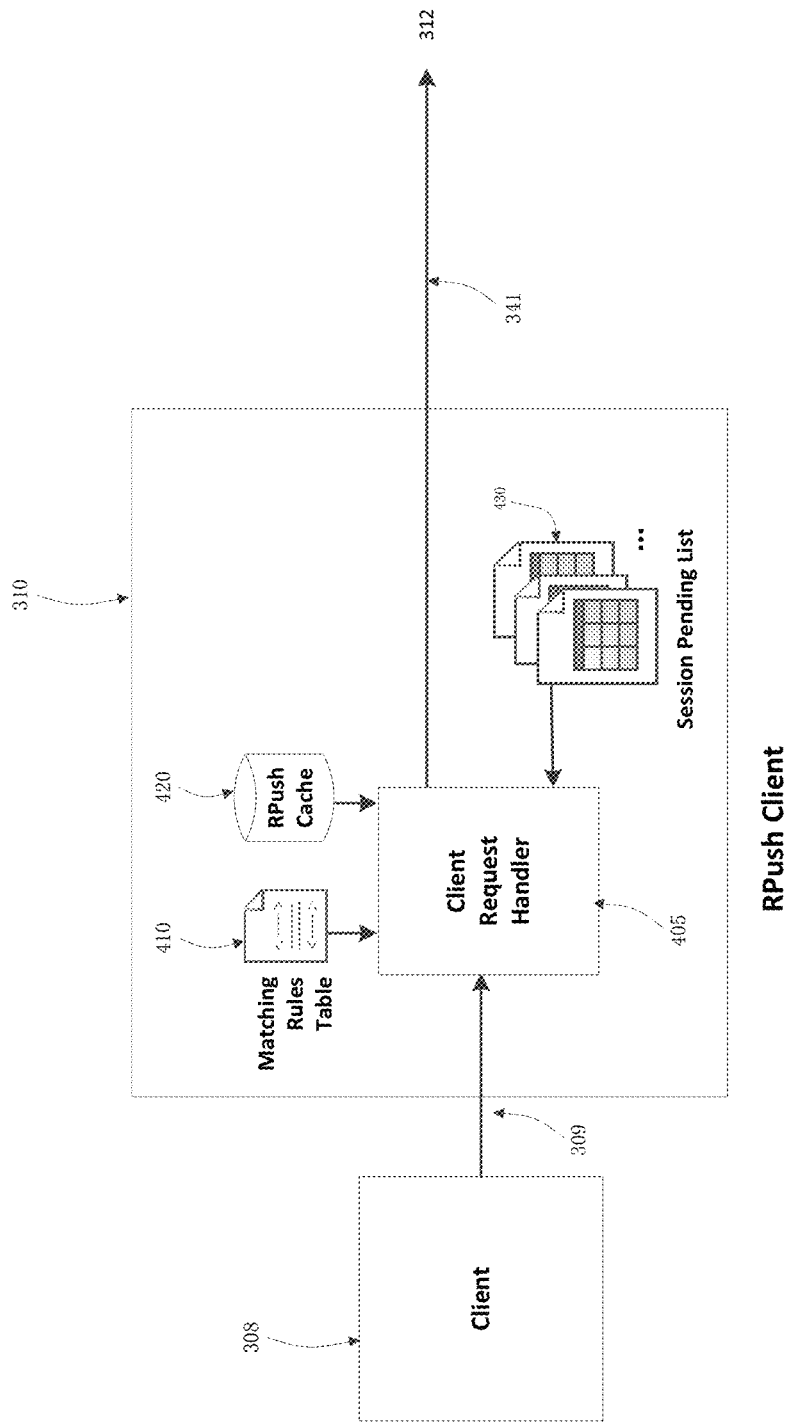
FIG. 4 is a schematic depiction illustrating further the client portion of the RPush proxy system ("RPush client", also referred to as "internet resource push client").

FIG. 4 is a schematic diagram illustrating further the RPush client 310. Central to the RPush client is the browser request handler 405, which maintains a standard HTTP interface with client 308 and an RPush proxy system interface through 341 with the RPush server. In addition to conducting the matching of pushed resources with their original browser requests based on matching rules table 410, the RPush client provides a staging area to account for the contemporaneous but asynchronous arrivals 309 and returns 341 of those requests and responses based on session pending list 430. All web page requests from the browser can be checked by the handler 405 against those responses collected from return messages already pushed in by the RPush server in response to the initial primary requests relayed by the RPush client 310. Browser requests not immediately answerable from the collected pushed messages are recorded in the RPush client session pending list 430 maintained by the handler in the memory, pending on the arrivals of their matching pushed responses. Return messages from the RPush server not yet applied to any incoming browser requests are also recorded and managed through the RPush client session pending list 430. Return responses carry with them the RPush-Marker generated by the RPush server, which is used to match with the browser request URLs according to the default rules and matching rules table 410.

Having internal knowledge of the browser cache may provide certain performance improvement, but functionally there is little need to replicate the browser cache at or to guarantee their consistency with the remote surrogate browser in many cases. However, in the situation where the browser cache is not directly accessible or is not easily replicated at the RPush server, some embodiments provide RPush proxy system cache 420 as an optional component. The RPush proxy system cache 420 can be implemented independent of the browser cache. The content of the RPush client cache 420 can be the mirror image of that 722 in FIG. 7 at the RPush server, created to eliminate the need of the surrogate browser to send requests for those cacheable resources and to eliminate the need to push full responses if they are found in the RPush proxy system cache. The management of the RPush server cache 722 and the cacheability of individual response messages from origin servers follow the basic caching requirements of HTTP as laid out in various RFCs.

To maintain their consistency between 722 and 420, all changes to cache entries at the RPush server may be passed to the RPush client and therefore are subject to the propagation latency from the RPush server to the client. The update of a particular cache entry may be carried out before its use by subsequent pushed entries, and the initial synchronization process may be placed at the start-up of the RPush proxy system in order to eliminate any inconsistencies. In addition to the reduction of round trips by the RPush proxy system, the RPush proxy system caches provide reduction of data to be transported from the RPush server.

Figure 5:
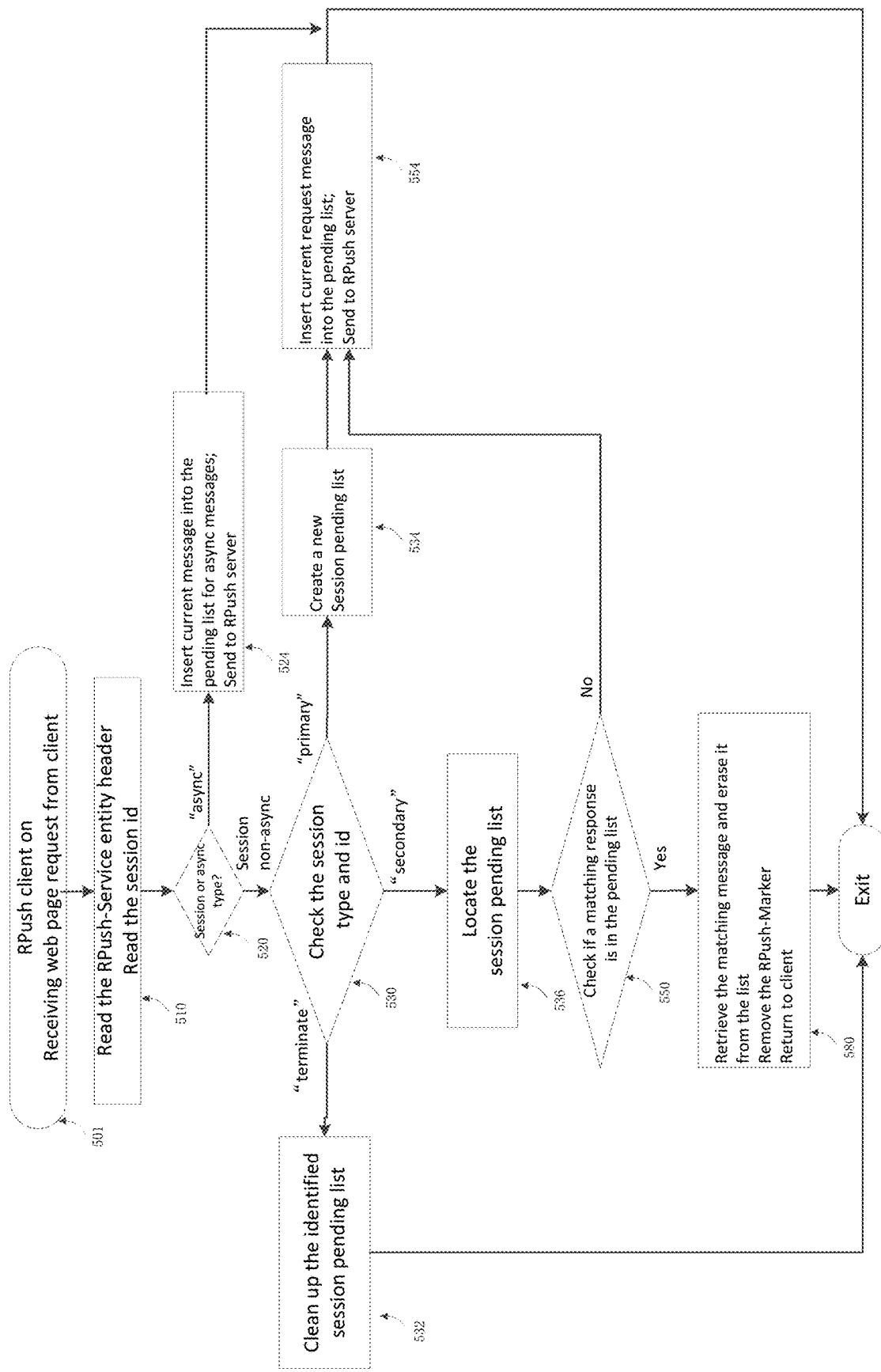
FIG. 5 illustrates a logic flow diagram for RPush client in answering client requests.

FIG. 5 illustrates a logic flow diagram applied when the RPush client receives a request from the browser 501. For this illustration, it is assumed that the session-related information is passed in through the entity header RPush-Service, based on which the session ID and related session data may be read at 510 and used in condition check in 520. If it is of the session type, namely not async, it is passed on to session handling logic, which starts a new session at 534 if it is of the "primary" type. If it is of "terminate" type, the identified session is terminated and cleaned up at 532. If it is of "secondary" type, which indicates the continuation of an existing session, the corresponding session pending list is located at 536. The current request is checked against entries on the pending list for a match at 550 based on matching rules table 410 and RPush-Marker. If a match is found, indicating that the pushed response has already arrived, the pushed entry is removed from the list and returned to browser as the response at 580, otherwise, it is inserted into the pending list and sent to the RPush server at 554, to be satisfied later. RPush-Marker in 580 was the entity header inserted into the response by the RPush server for matching purpose. If the current browser request is of "async" type, it is forwarded straight to the RPush server at 524 without involving any session logic in this embodiment. This is an outline of the logic flow without offering all the trivial details such as session clean-up, session timeout, session not found, handling of error conditions, etc.

Figure 6:
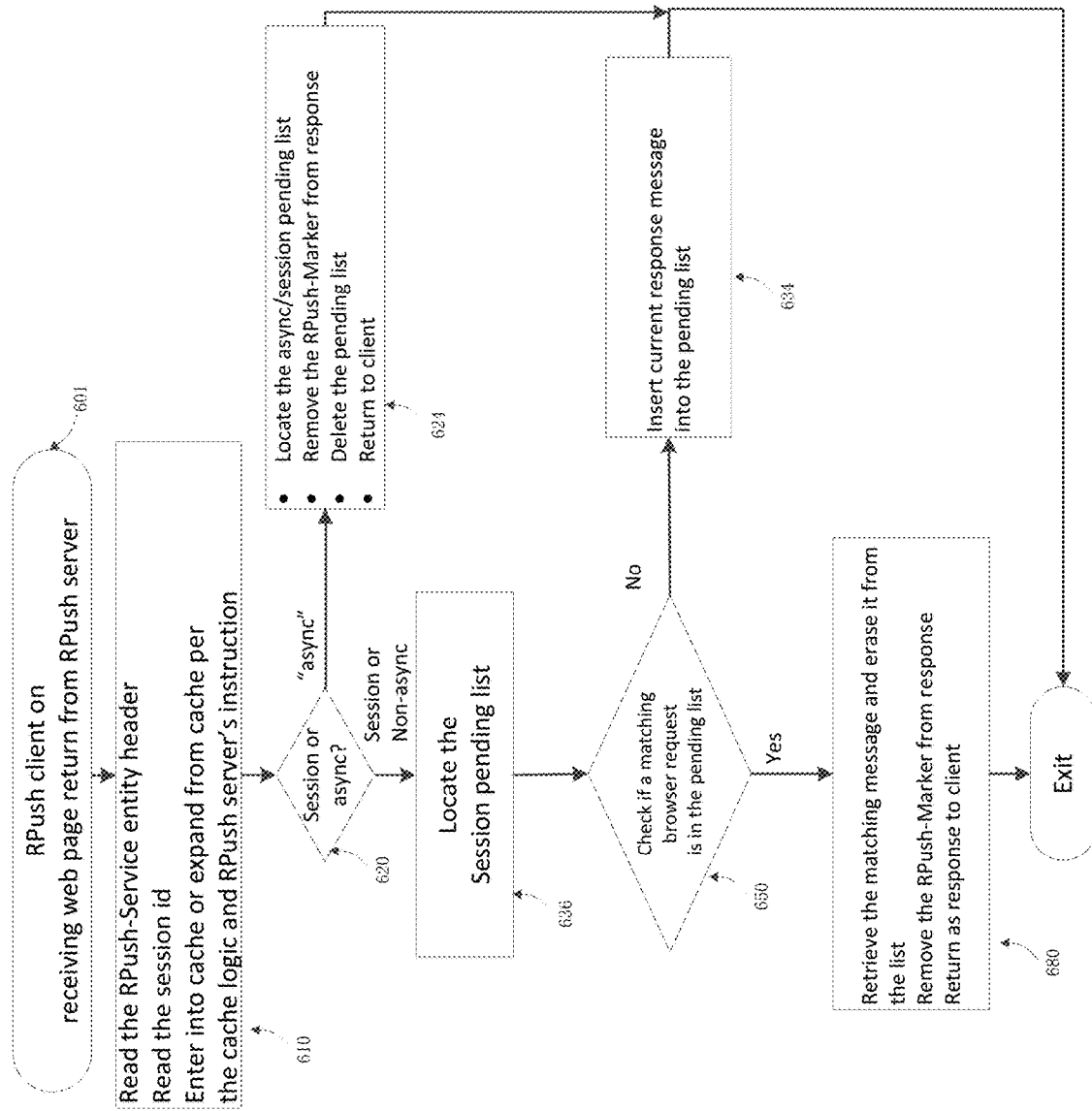
FIG. 6 illustrates a logic flow diagram for RPush client in handling return messages from the RPush server.

FIG. 6 illustrates a logic flow diagram applied when RPush client receives a return message from the RPush server with a RPush-Marker. The communication between the RPush client and the RPush server does not conform to HTTP standard and return messages from the RPush server to the RPush client are to be matched to specific browser requests for the identified session in 636, based on matching rules table. If a match is found in the check 650, remove it from the pending list and return to browser as a response in 680. If a match is not found, insert it into the pending list waiting for the arrival of matching browser request in 634 (to be matched in 580). If it is of the async type, locate the pending list, return the response to browser and terminate this async request at 624. Note that the RPush proxy system cache 420 is used at 610 to either expand the response to its full content if found cached or receive new cache entry if indicated in the response by RPush server.

Figure 7:
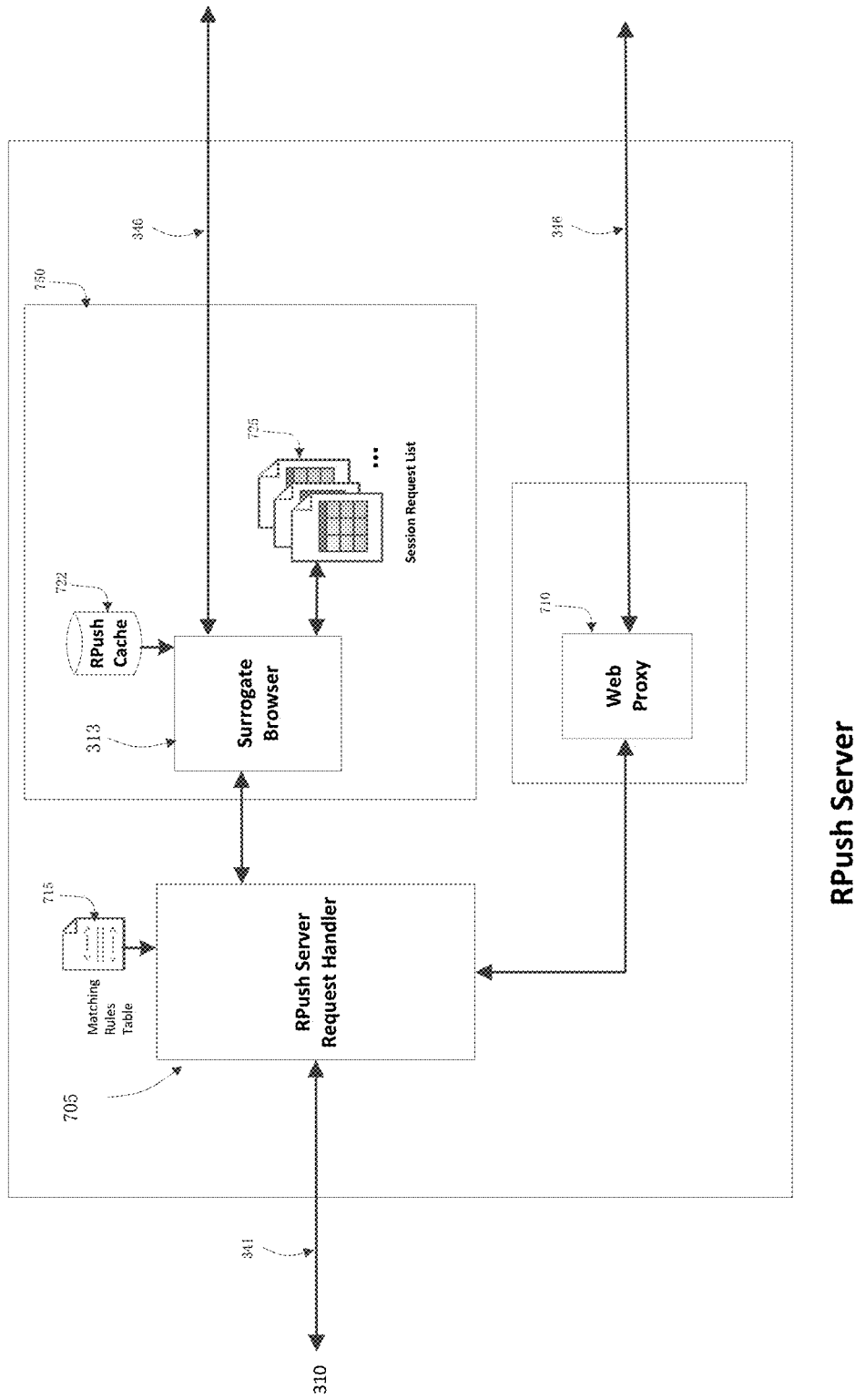
FIG. 7 is a schematic depiction illustrating further the server portion of the RPush proxy system ("RPush server", also called internet resource push server).

FIG. 7 is a schematic diagram further illustrating the RPush server. The RPush server has embedded within a surrogate browser 313 that has functionally the same processing capabilities as the client 308. All critical elements of the client browser processing environment are replicated in the RPush server so that the surrogate browser is capable of processing independently for a given a primary web page request, issuing follow-on requests, and retrieving substantially the same set of required resources. Once retrieved, the surrogate browser automatically "pushes" all retrieved resources to the RPush client 310/405.

The surrogate browser also maintains a list of all requests already issued to origin servers for a particular session (session request list 725). A browser request not satisfied by the flow of pushed entries or not found in the session pending list 430 when first arrived at the RPush client would be forwarded to the RPush server from the RPush client. Those entries would ordinarily find themselves in this session request list 725. If this is not the case, they will be independently issued to the target origin server, the response of which will also be added to the flow of pushed entries. The session pending list is discarded at the termination of the session.

The surrogate browser is the more complicated component of the RPush server. The RPush server request handler 705 also plays the role of a dispatcher for those one-off requests, which are without the complexity of resources waterfall and sent to a straightforward web proxy 710. They will be sent to the origin server and the response returned to the RPush client straightaway in the resource push stream. The matching rules are usually not necessary in this case. However, the RPush server request handler 705 maintains and dispenses the matching rules table 715, mirrored also on the RPush client as 410, whenever a client browser request or web proxy 710 request needs be matched with that issued by the surrogate browser or the web proxy.

Figure 8:
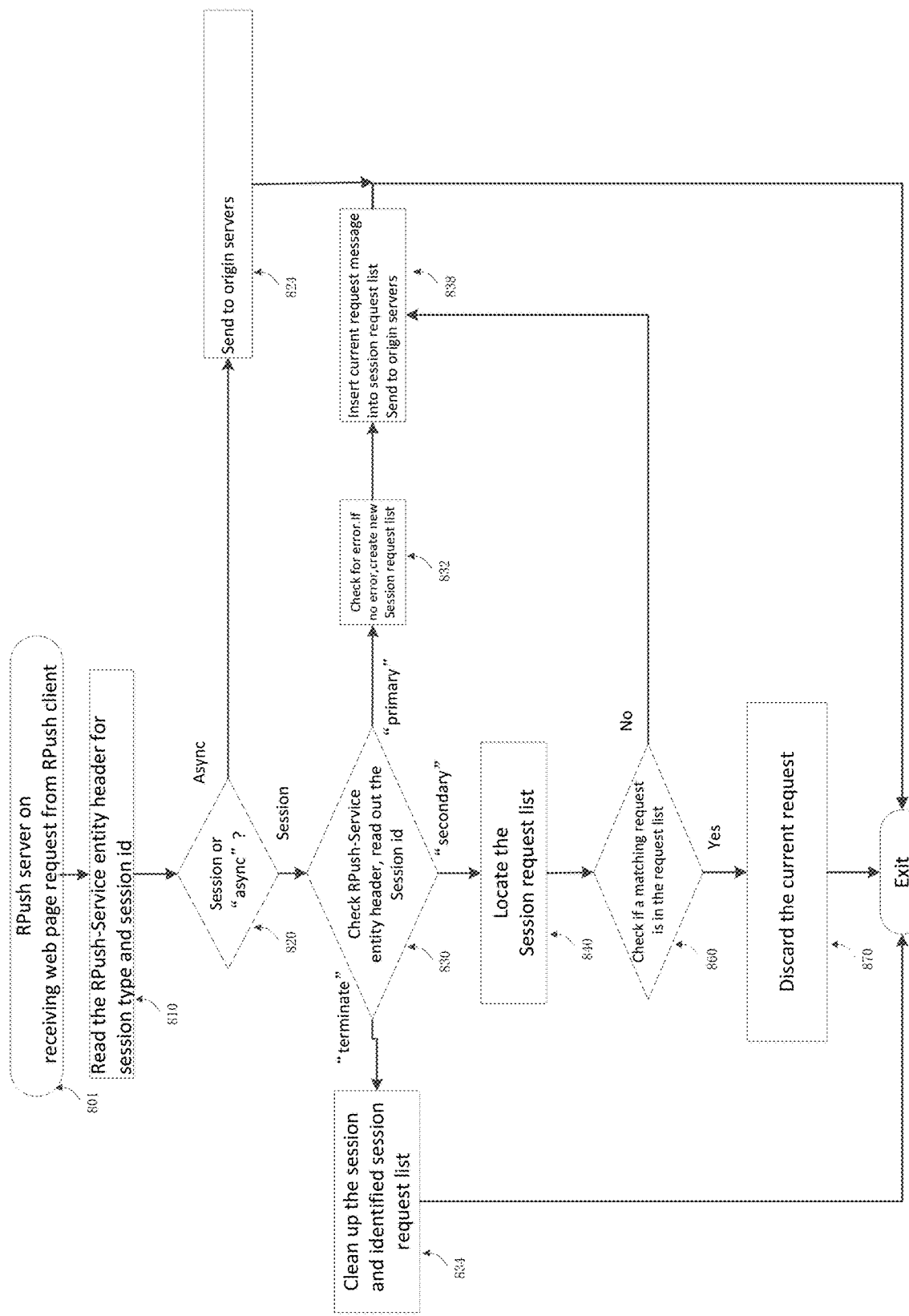
FIG. 8 illustrates a logic flow diagram for RPush server in answering RPush client requests.

FIG. 8 illustrates a logic flow diagram applied when the RPush server receives a request message from the RPush client starting at 801. The session ID is fetched from the entity header RPush-Service at 810 and checked at 820. It is dispatched to the web proxy 710 and sent to origin server at 824 if it is of the "async" type. If it is of "primary" type, the session ID is checked for error to see if there is a session with the same session ID. If there is no error, a session entry is created in the session request list at 832, and entered into the session request list and sent to origin servers at 838. If it is of "secondary" type, the existing session request list is located at 840 and checked to see if there is a matching entry in the request list which has already been issued to origin servers at 860. If the answer of the check at 860 is negative and no match found, the entry is entered into the request list for the current session and sent to origin server at 838. If check 860 reports a match, the current request is dropped. If it is of "terminate" type, the session request list for the current session is erased at 834.

Figure 9:
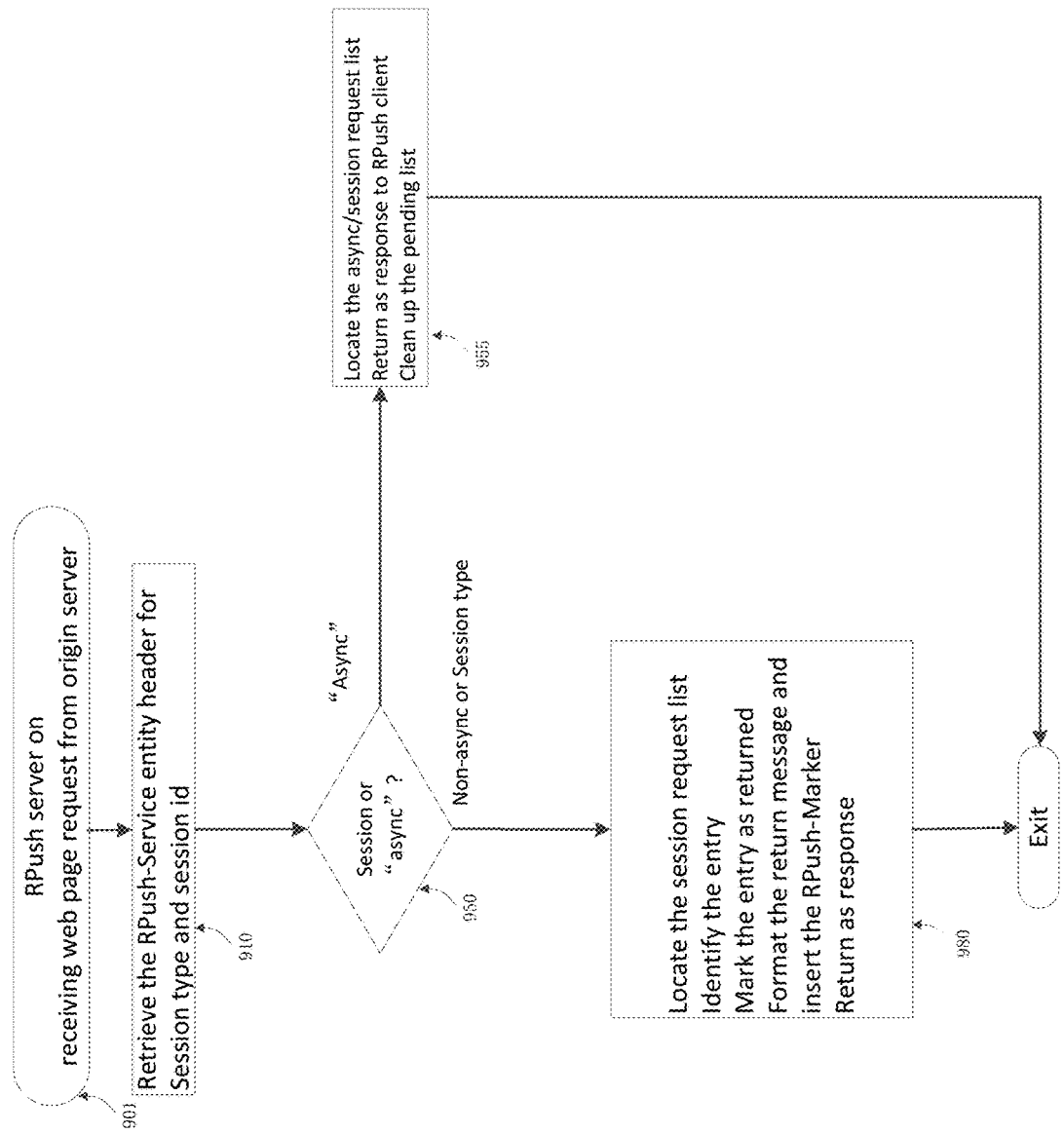
FIG. 9 illustrates a logic flow diagram for RPush server applied when the RPush server receives a response message from origin servers.

FIG. 9 illustrates a logic flow diagram applied when the RPush server receives a response message from origin servers. It reads the entity header RPush-Service from the response at 910 and check for type at 950. If 950 reports that it is not of "async" type, namely a "primary" or "secondary" type, the session request list is located, the entry is identified, the entry is marked as returned, and the response is pushed to RPush client at 980. If it is of the "async" type, the request list is located and the response is pushed to RPush client at 955. Here we assume the RPush-Service entity header may be carried in the request to origin server, which will be ignored by the origin servers. If this is not the case, the RPush-Service could be maintained in the session request list and the header stripped before sending out to the origin server. As the protocol along the path 346 is HTTP, the recovery of the original request and its matching RPush-Service data is straightforward.

Note that the maintenance logic flow for RPush server cache 722 and its slave 420 are not included completely in FIG. 8, FIG. 9, FIG. 4 or FIG. 5. As the RPush server is a proxy functionally similar to the original client in accessing origin server resources, some embodiments adopt the typical or standard method for managing the HTTP cache. Those of skill in the art will appreciate many open-source implementations available for getting the details, such as the squid-cache or varnish-cache projects. However, the maintenance of this RPush server 722 cache may be mirrored or extended to its slave at the RPush client, namely the RPush client cache 420.

This description uses HTTP scheme as the primary example of the application of the disclosed techniques. Other HTTP schemes such as "news:", "mailto:", etc., in which one or many successional round trips occur, may also apply the disclosed techniques, such as by utilizing a remote surrogate browser for reducing the number of round trips.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory program carrier for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them. The computer storage medium is not, however, a propagated signal.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a standalone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A computer-implemented method, comprising:
   receiving, by a client proxy system and from a first browser at a client device, a first primary request for a first primary electronic resource provided by an origin server system;
   transmitting, from the client proxy system and to a push server system, the first primary request for the electronic resource, wherein:
   (i) the push server system includes a surrogate browser configured to invoke a session for tracking resource retrievals associated with the first primary request,
   (ii) the surrogate browser is configured to independently issue requests to other servers to obtain a collection of resources responsive to the first primary request and related secondary requests,
   (iii) the push server system is configured to automatically return the collection of resources to the client proxy system, and (iv) the push server system is configured to adjust settings of the surrogate browser for the session to at least partially replicate, with the surrogate browser, a configuration of the first browser at the client device when issuing requests to other servers, including when issuing the first primary request and the related secondary requests;

receiving, by the client proxy system and from the push server system, a first response and a second response that is distinct from the first response, wherein (i) the first response is a response to the first primary request for the first primary electronic resource and (ii) the second response contains a response to a first secondary request that the push server system generated independently of the client device and independently of the client proxy system as a follow-on to the first primary request, wherein the first response and the second response are among the collection of resources that are automatically returned from the push server system;

caching the second response at the client proxy system in association with the session as a result of the second response corresponding to the first secondary request that followed from the first primary request that invoked the session;

providing, by the client proxy system, the first response to the client device;

receiving, by the client proxy system, a second secondary request from the client device;

determining, by the client proxy system, whether the cached second response that was received from the push server system is a valid response to the second secondary request that was received from the client device; and in response to determining that the cached second response is a valid response to the second secondary request, providing the cached second response from the client proxy system to the client device.

2. The computer-implemented method of claim 1, wherein:
the first primary electronic resource is a web page, and
at least one of the first primary request or the second secondary request is a Hypertext Transfer Protocol (HTTP) request.

3. The computer-implemented method of claim 1, wherein:
the second response to the first secondary request includes an indication of a URL associated with the first secondary request, and
determining whether the cached second response is a valid response to the second secondary request comprises applying a set of matching rules to compare a URL associated with the second secondary request with the URL associated with the first secondary request.

4. The computer-implemented method of claim 1, wherein a network latency between the push server system and the origin server system is less than a network latency between the client device and the origin server system.

5. One or more non-transitory computer-readable media having instructions stored thereon that, when executed by one or more processors, cause the one or more processors to perform operations comprising:
receiving, by a client proxy system and from a first browser at a client device, a first primary request for a first primary electronic resource provided by an origin server system;
transmitting, from the client proxy system and to a push server system, the first primary request for the electronic resource, wherein:
(i) the push server system includes a surrogate browser configured to invoke a session for tracking resource retrievals associated with the first primary request,
(ii) the surrogate browser is configured to independently issue requests to other servers to obtain a collection of resources responsive to the first primary request and related secondary requests,
(iii) the push server system is configured to automatically return the collection of resources to the client proxy system, and
(iv) the push server system is configured to adjust settings of the surrogate browser for the session to at least partially replicate, with the surrogate browser, a configuration of the first browser at the client device when issuing requests to other servers, including when issuing the first primary request and the related secondary requests;

receiving, by the client proxy system and from the push server system, a first response and a second response that is distinct from the first response, wherein (i) the first response is a response to the first primary request for the first primary electronic resource and (ii) the second response contains a response to a first secondary request that the push server system generated independently of the client device and independently of the client proxy system as a follow-on to the first primary request, wherein the first response and the second response are among the collection of resources that are automatically returned from the push server system;

caching the second response at the client proxy system in association with the session as a result of the second response corresponding to the first secondary request that followed from the first primary request that invoked the session;

providing, by the client proxy system, the first response to the client device;

receiving, by the client proxy system, a second secondary request from the client device;

determining, by the client proxy system, whether the cached second response that was received from the push server system is a valid response to the second secondary request that was received from the client device; and in response to determining that the cached second response is a valid response to the second secondary request, providing the cached second response from the client proxy system to the client device.

6. The one or more non-transitory computer-readable media of claim 5, wherein:
the first primary electronic resource is a web page, and
at least one of the first primary request or the second secondary request is a Hypertext Transfer Protocol (HTTP) request.

7. The one or more non-transitory computer-readable media of claim 5, wherein at least partially replicating, with the surrogate browser, the configuration of the first browser at the client device comprises issuing requests that indicate at least one of a display resolution or a time zone that matches a display resolution or a time zone of the client device.

8. The one or more non-transitory computer-readable media of claim 5, wherein:

the second response to the first secondary request includes an indication of a URL associated with the first secondary request, and determining whether the cached second response is a valid response to the second secondary request comprises applying a set of matching rules to compare a URL associated with the second secondary request with the URL associated with the first secondary request.

9. The one or more non-transitory computer-readable media of claim 5, wherein a network latency between the push server system and the origin server system is less than a network latency between the client device and the origin server system.

10. The computer-implemented method of claim 1, further comprising associating, by the client proxy system, each of the first response and the second response that the client proxy system received from the push server system with the first session for the first primary request.

11. The computer-implemented method of claim 10, wherein determining, by the client proxy system, whether the cached second response that was received from the push server system is a valid response to the second secondary request that was received from the client device comprises determining that the cached second response and the second secondary request are both associated with the first session that corresponds to the first primary request.

12. The computer-implemented method of claim 1, wherein invoking the session for tracking resource retrievals associated with the first primary request comprises identifying a session ID for the session that is specified in a message received by the client proxy system from the client device.

13. The computer-implemented method of claim 12, further comprising mapping the session ID specified in the message received from the client device to a global session ID, thereby ensuring that session IDs specified in messages from different client devices are not duplicative of each other.

14. The computer-implemented method of claim 1, wherein the second response contains a secondary electronic resource referenced by the first primary electronic resource.

15. The computer-implemented method of claim 1, further comprising establishing, by the client proxy system, a first session for the first primary request, wherein the client proxy system is configured to maintain a plurality of sessions including the first session, wherein each session of the plurality of sessions tracks resource retrievals associated with a respective primary request for the session and each secondary request that follows from the respective primary request for the session.

16. The computer-implemented method of claim 15, wherein each session of a plurality of sessions tracks resource retrievals for each secondary request that follows from a respective primary request for the session, including (i) tracking secondary responses received from the push server system to secondary requests issued in advance by the push proxy system and (ii) tracking secondary requests received from client devices.

17. The computer-implemented method of claim 1, wherein at least partially replicating, with the surrogate browser, the configuration of the first browser at the client device comprises issuing requests that indicate at least one of a display resolution or a time zone that matches a display resolution or a time zone of the client device.

18. A client proxy system comprising,
one or more processors; and
one or more non-transitory computer-readable media having instructions stored thereon that, when executed by the one or more processors, cause performance of operations comprising:

receiving, by the client proxy system and from a first browser at a client device, a first primary request for a first primary electronic resource provided by an origin server system;

transmitting, from the client proxy system and to a push server system, the first primary request for the electronic resource, wherein:
 (i) the push server system includes a surrogate browser configured to invoke a session for tracking resource retrievals associated with the first primary request,
 (ii) the surrogate browser is configured to independently issue requests to other servers to obtain a collection of resources responsive to the first primary request and related secondary requests,
 (iii) the push server system is configured to automatically return the collection of resources to the client proxy system, and
 (iv) the push server system is configured to adjust settings of the surrogate browser for the session to at least partially replicate, with the surrogate browser, a configuration of the first browser at the client device when issuing requests to other servers, including when issuing the first primary request and the related secondary requests;

receiving, by the client proxy system and from the push server system, a first response and a second response that is distinct from the first response, wherein (i) the first response is a response to the first primary request for the first primary electronic resource and (ii) the second response contains a response to a first secondary request that the push server system generated independently of the client device and independently of the client proxy system as a follow-on to the first primary request, wherein the first response and the second response are among the collection of resources that are automatically returned from the push server system;

caching the second response at the client proxy system in association with the session as a result of the second response corresponding to the first secondary request that followed from the first primary request that invoked the session;

providing, by the client proxy system, the first response to the client device;

receiving, by the client proxy system, a second secondary request from the client device;

determining, by the client proxy system, whether the cached second response that was received from the push server system is a valid response to the second secondary request that was received from the client device; and in response to determining that the cached second response is a valid response to the second secondary request, providing the cached second response from the client proxy system to the client device.

19. The client proxy system of claim 18, wherein at least partially replicating, with the surrogate browser, the configuration of the first browser at the client device comprises issuing requests that indicate at least one of a display resolution or a time zone that matches a display resolution or a time zone of the client device.

20. The computer-implemented method of claim 3, wherein the set of matching rules are defined in a matching rules table maintained at the client proxy system.

* * * * *